(12) United States Patent
Huang et al.

(10) Patent No.: US 8,076,584 B2
(45) Date of Patent: Dec. 13, 2011

(54) POWER ADAPTER WITH CABLE ORGANIZER

(75) Inventors: Wen-Hung Huang, Tucheng (TW);
Guan-De Liou, Taipei (TW); Stephen Tsai, Sijhih (TW)

(73) Assignee: Hannspree, Inc., Taipei (TW)

( * ) Notice: Subject to any disclaimer, the term of this patent is extended or adjusted under 35 U.S.C. 154(b) by 509 days.

(21) Appl. No.: 12/324,093

(22) Filed: Nov. 26, 2008

(65) Prior Publication Data

US 2010/0038113 A1  Feb. 18, 2010

(30) Foreign Application Priority Data

Aug. 15, 2008  (TW) ................ 97131343 A

(51) Int. Cl.
*H01B 7/00* (2006.01)
(52) U.S. Cl. ....... 174/135; 174/100; 174/68.1; 439/131; 439/501
(58) Field of Classification Search ............... 174/68.1, 174/72 A, 100, 135; 439/131, 501
See application file for complete search history.

(56) References Cited

U.S. PATENT DOCUMENTS

| | | | | |
|---|---|---|---|---|
| 4,921,444 A * | 5/1990 | Cama | ............................ | 439/528 |
| 7,098,406 B1 * | 8/2006 | Hammonds | .................... | 174/154 |
| 7,172,456 B1 * | 2/2007 | Nagy | ............................ | 439/501 |
| 7,459,636 B2 * | 12/2008 | Conrad | ........................ | 174/135 |
| 7,608,786 B2 * | 10/2009 | Deciry et al. | ................. | 174/135 |
| 7,868,250 B2 * | 1/2011 | Kolada | ............................ | 174/53 |

FOREIGN PATENT DOCUMENTS

| | | |
|---|---|---|
| CN | 2821369 Y | 8/2006 |
| TW | 200820161 A | 5/2008 |

OTHER PUBLICATIONS

CN Office Action dated Dec. 14, 2010.

* cited by examiner

*Primary Examiner* — Dhirubhai R Patel
(74) *Attorney, Agent, or Firm* — Volpe and Koenig, P. C.

(57) ABSTRACT

A power adapter with cable organizer is provided. The power adapter includes a main body; and a containing/fixing portion disposed on the main body and having a first blade and a second blade, wherein the first blade and the second blade face each other to form a receiving portion.

6 Claims, 6 Drawing Sheets

US 8,076,584 B2

POWER ADAPTER WITH CABLE ORGANIZER

FIELD OF THE INVENTION

The present invention relates to a power adapter, and more particularly to a power adapter with cable organizer.

BACKGROUND OF THE INVENTION

The digital mobile device is becoming more and more popular. With the digital mobile device like a notebook computer, the worker who often works outside has to repeatedly assemble the commonly used accessories like a cable or a power adapter, during the process of moving and using the digital mobile device. Such accessory generally includes cables 01, 02 and a main body 10, as shown in FIG. 1. The cable 02 is connected to the digital mobile device and the cable 01 is connected to the power socket, and the main body 10 includes a circuit portion 03 of the accessory. In the conventional power adapter, the main body thereof lacks the design of fixing at an environment and also the function of cable organizing. Due to various operating environments, the notebook computer user has to endure limitation and inconvenience since the power adapter cannot be fixed. The common situation is that many power adapters are placed on the conference desk in disorder, which occupies much space of the desk. Another issue that bothers is that the notebook computer user has to deal with the disordered cables when picking up these accessories, since these accessories lack the function of cable organizing.

In order to overcome the drawbacks in the prior art, an improved power adapter with cable organizer is provided. The particular design in the present invention not only solves the problems described above, but also is easy to be implemented. Thus, the present invention has the cable organizing utility for the adapter industry.

SUMMARY OF THE INVENTION

In accordance with one aspect of the present invention, a power adapter with cable organizer is provided. The power adapter is connected to a mobile electronic or mechanical device. When in use, the power adapter can be fixed at a position that is convenient and does not hinder the user from operating the power adapter, in cooperation with the surrounding environments.

In accordance with another aspect of the present invention, a power adapter with cable organizer is provided. The power adapter includes a main body; and a containing/fixing portion disposed on the main body and having a first blade and a second blade, wherein the first blade and the second blade face each other to form a receiving portion.

Preferably, at least a part of the cable is arranged inside the receiving portion.

Preferably, the power adapter further includes at least one auxiliary fixing portion disposed at an outside of at least one of the first blade and the second blade, and a fixing element is attached to the at least one auxiliary fixing portion.

Preferably, the fixing element is one selected from a group consisting of a string, a rope, a Velcro, a clip, a magnet, an adhesive or an arbitrary combination thereof.

Preferably, the power adapter further includes at least one force-applying element disposed at an outer surface of at least one of the first blade and the second blade, wherein at least one of the first blade and the second blade is opened outward by applying a force to the force-applying element.

In accordance with a further aspect of the present invention, a power adapter with cable organizer is provided. The power adapter includes a main body; and a containing/fixing portion having a first blade and a second blade, wherein the first blade and the second blade are pivotally connected to the main body and face each other to form a receiving portion.

Preferably, the power adapter further includes at least one auxiliary fixing portion disposed at an outside of at least one of the first blade and the second blade, and a fixing element is attached to the at least one auxiliary fixing portion.

Preferably, the fixing element is one selected from a group consisting of a string, a rope, a Velcro, a clip, a magnet, an adhesive or an arbitrary combination thereof.

In accordance with further another aspect of the present invention, a power adapter with cable organizer is provided. The power adapter includes a main body; a connecting portion rotatably disposed on the main body; a containing/fixing portion having a first blade and a second blade, wherein the first blade and the second blade are jointly connected to a side of the connecting portion and face each other to form a receiving portion; and a first extending force-applying portion and a second extending force-applying portion respectively extended from another side of the connecting portion, wherein the first blade and the second blade are opened outward by applying a force to the first extending force-applying portion and the second extending force-applying portion.

Preferably, the power adapter further includes at least one auxiliary fixing portion disposed at an outside of at least one of the first blade and the second blade, and a fixing element is attached to the at least one auxiliary fixing portion.

Preferably, the fixing element is one selected from a group consisting of a string, a rope, a Velcro, a clip, a magnet, an adhesive or an arbitrary combination thereof.

The above objects and advantages of the present invention will become more readily apparent to those ordinarily skilled in the art after reviewing the following detailed descriptions and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

Figure 1:
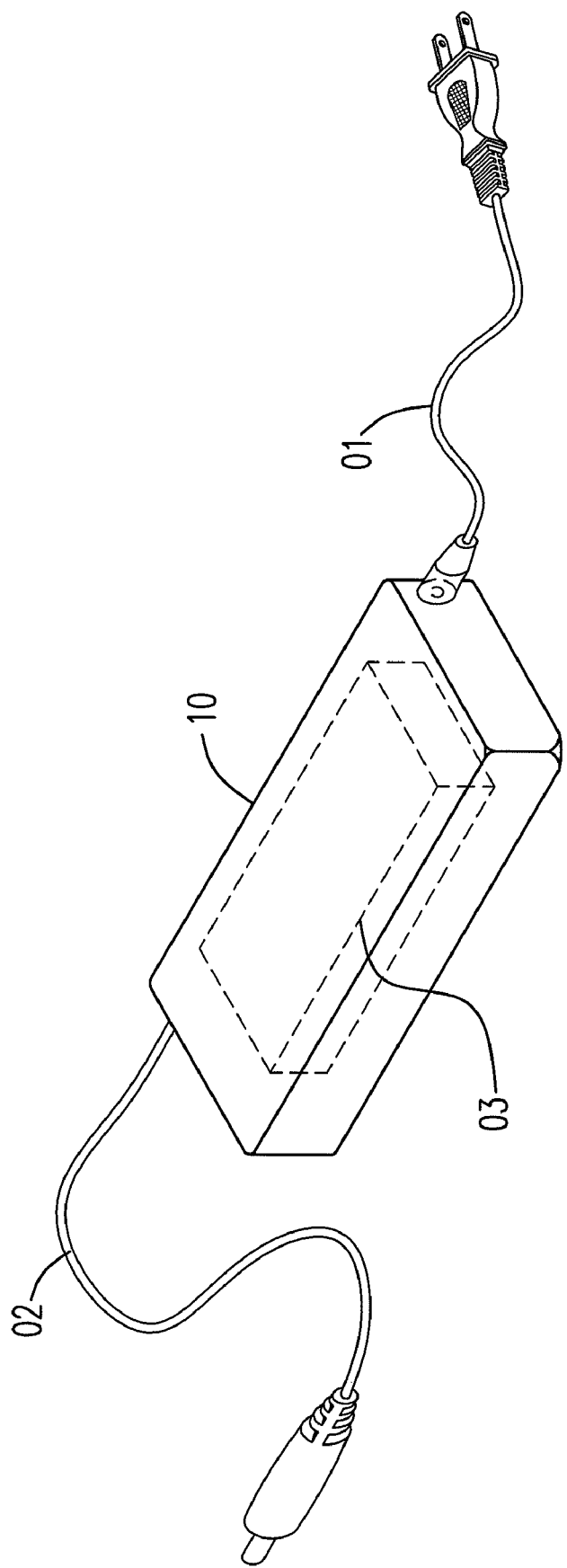
FIG. 1 is a schematic diagram showing the structure of a conventional power adapter.
Figure 2:
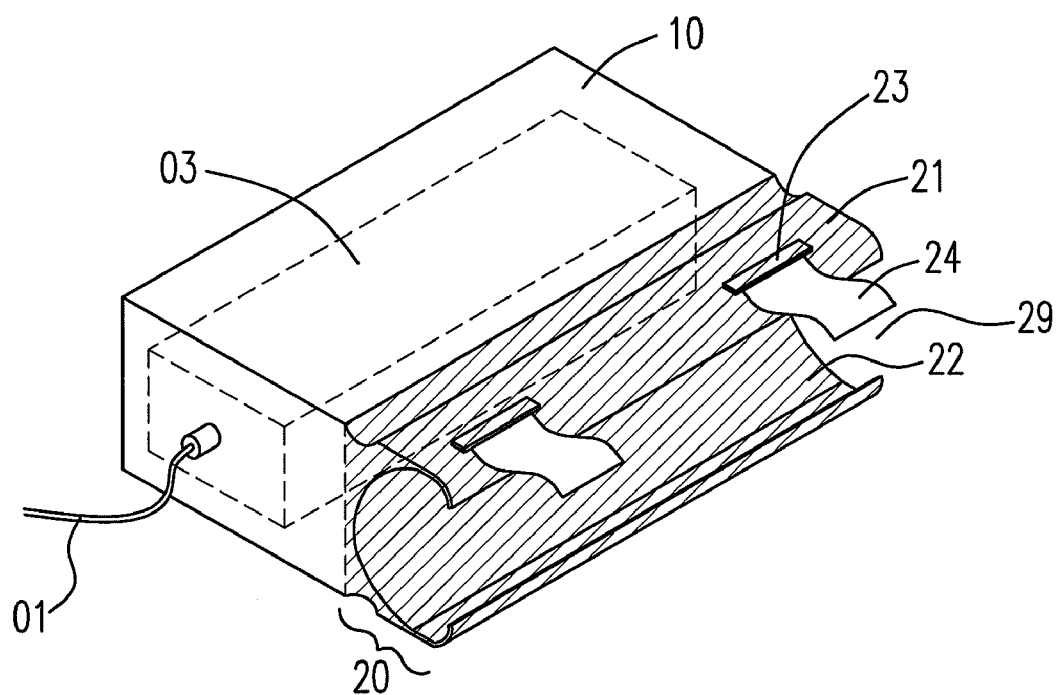
FIG. 2 is a schematic diagram showing the structure of the power adapter with cable organizer according to a preferred embodiment of the present invention.

Referring to FIG. 2, which is a schematic diagram showing the structure of a power adapter with cable organizer according to a preferred embodiment of the present invention. The power adapter includes a main body 10 and a containing/fixing portion 20. A circuit portion 03 is disposed inside the main body 10. The containing/fixing portion 20 is disposed on the main body 10 and has a first blade 21 and a second blade 22, wherein the first blade 21 and the second blade 22 face each other to form a receiving portion 29. The containing/fixing portion 20 can be fixed at an environment through the receiving portion 29. For example, the environment can be an office tool, a conference apparatus, a lighting apparatus, a desk leg, a desk edge, a computer or its peripherals. For example, the power adapter of the notebook computer can be fixed at a desk edge, a desk leg, a lamppost, or any surrounding environment that can be attached through the containing/fixing portion 20 of the present invention. The advantage of fixing these disordered accessories at the surrounding environment is that these accessories will not bother the user when he is working and will not occupy the space of the desk top.

Besides, for strengthening the effect of the power adapter being fixed at the surrounding environment, the present invention further provides at least one auxiliary fixing portion 23 disposed at the outside of the first blade 21 or the second blade 22, and a fixing element 24 is attached to the auxiliary fixing portion 23. For example, the fixing element 24 can be a string, a rope, a Velcro, a clip, a magnet, an adhesive or an arbitrary combination thereof.

In addition to the above functions, the power adapter of the present invention further possesses the function of containing cables of the power adapter. The receiving portion 29 of the containing/fixing portion 20 can contain a cable 01 of the power adapter, wherein the cable 01 can be a power cable, a signal cable, an extended cable and a conducting cable. For instance, the power cable of the power adapter of the notebook computer can be arranged and contained in the receiving portion 29 of the containing/fixing portion 20 of the present invention.

Figure 3:
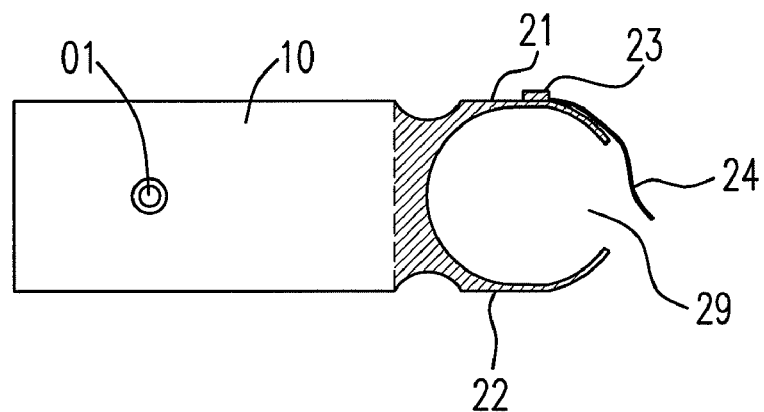
FIG. 3 is a lateral view of the power adapter with cable organizer in the present invention.

Please refer to FIG. 3, which is a side view of the power adapter with cable organizer in the present invention. As shown in FIG. 3, the auxiliary portion 23 is disposed at the outside of the first blade 21, and the fixing element 24 is attached to the auxiliary portion 23. If the fixing element 24 is the Velcro, the magnet or the adhesive, the auxiliary fixing portion 23 does not need to be disposed at the outside of the second blade 22. In this case, it only needs to provide another element for cooperating with the fixing element 24 by pasting or other ways to achieve the effect of strengthening fixation, and vice versa.

Figure 4:
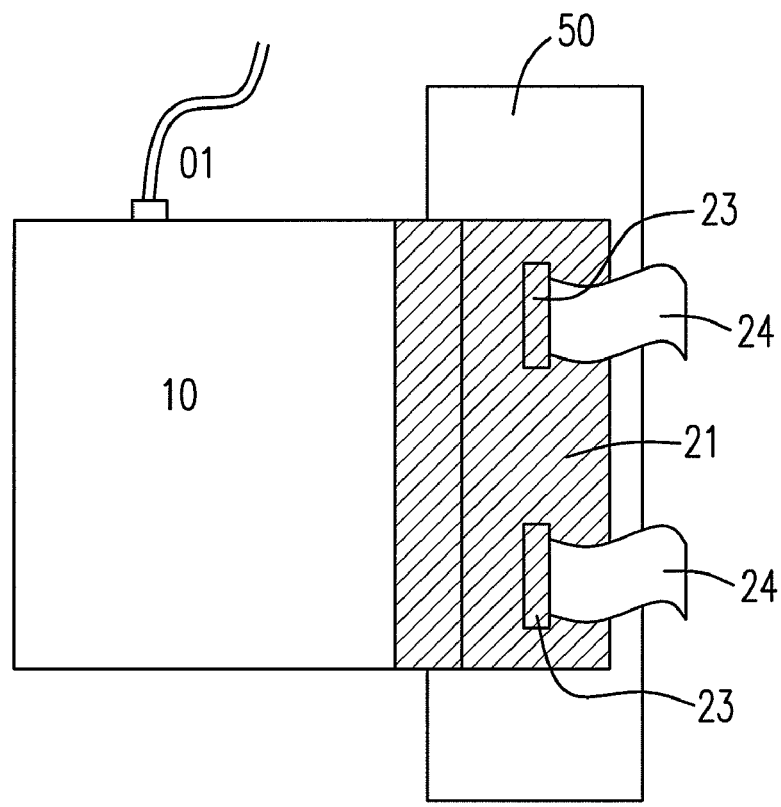
FIG. 4 shows the power adapter with cable organizer of the present invention in use.

Please refer to FIG. 4, which shows the power adapter with cable organizer of the present invention in use. The power adapter of the present invention is fixed at an environment 50, such as an office tool, a conference apparatus, a lighting apparatus, a desk leg, a desk edge, a computer or its peripherals. When the power adapter of the present invention is fixed at the desk edge or the portion with a larger area, the containing/fixing portion 20 can use the first blade 21 and the second blade 22 to clip the desk top or most of the edge. When the size of the environment 50 is smaller, the fixing element 24 can be used to tie against the environment 50 firmly. Therefore, the fixing element 24 is basically an auxiliary element.

Figure 5:
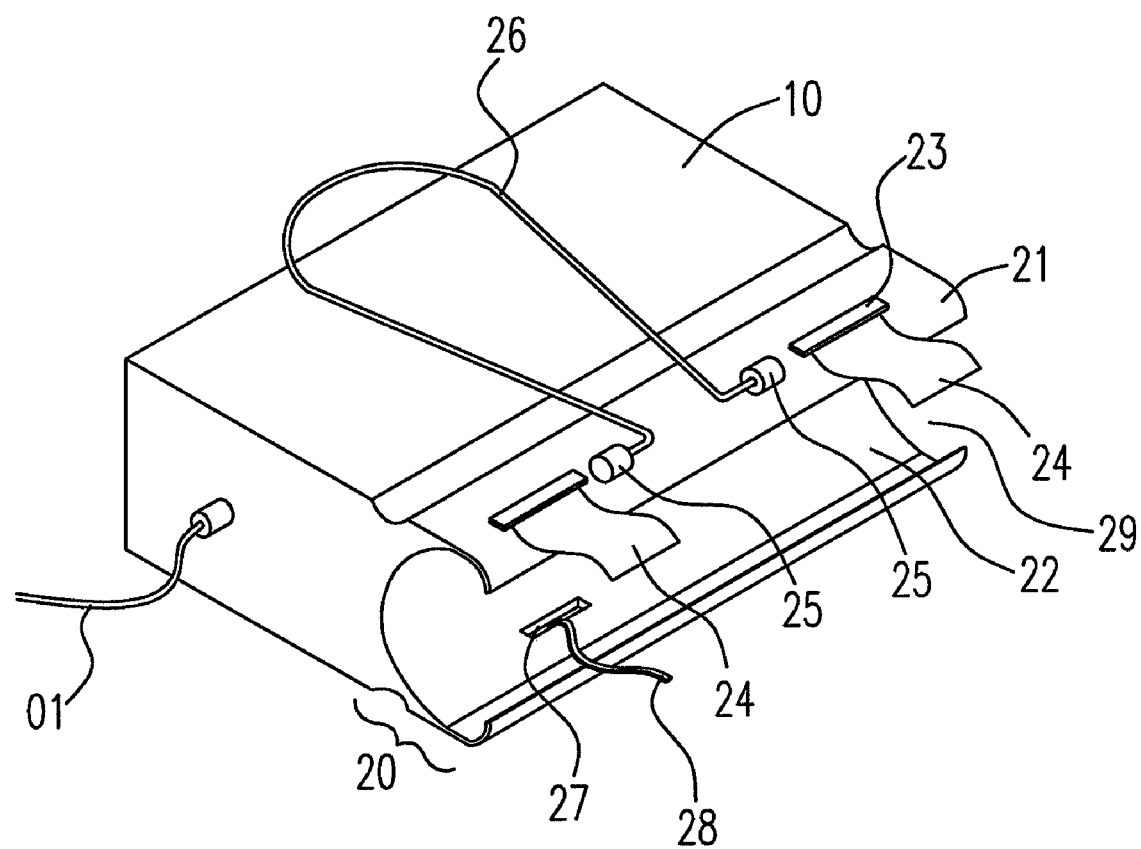
FIG. 5 is a schematic diagram showing the structure of the power adapter with cable organizer according to another preferred embodiment of the present invention.

Please refer to FIG. 5, which is a schematic diagram showing the structure of the power adapter with cable organizer according to another preferred embodiment of the present invention. The power adapter further includes at least one fixing portion 25 disposed at the outer surface of the first blade 21 or the second blade 22, and a force-applying element 26 is attached to the fixing portion 25. For instance, the force-applying element 26 can be a string, a rope, a lever or an arbitrary combination thereof, and the containing/fixing portion 20 is opened by applying force to the force-applying element 26. The shape of the force-applying element 26 is similar to the lever portion of a long-tail clip. When used, two ends of the force-applying element 26 are respectively inserted into the fixing portions 25 on the first blade 21 or the second blade 22, so that the user can employ the lever principle to easily open the first blade 21 or the second blade 22 outward. An auxiliary fixing portion 27 is disposed on the second blade 22, and a fixing element 28 is attached to the auxiliary fixing portion 27 for fixing the cable 01 in the receiving portion 29 of the containing/fixing portion 20. The fixing element 28 can be a string, a rope, a Velcro, a clip, a magnet, an adhesive or an arbitrary combination thereof.

Figure 6:
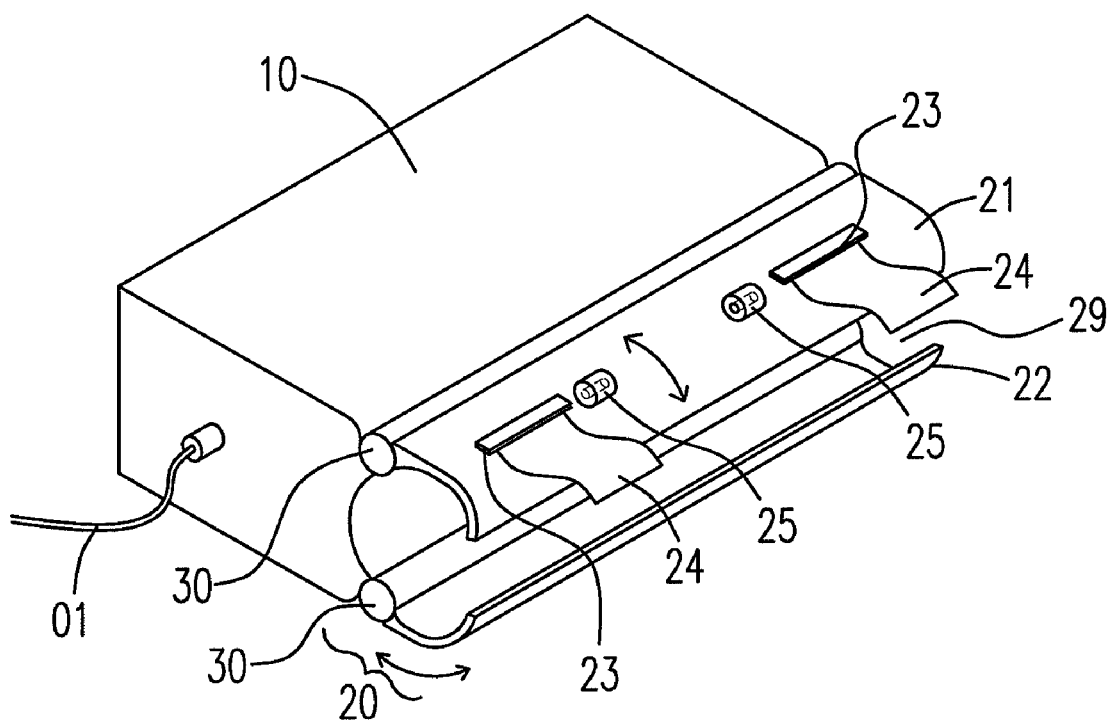
FIG. 6 is a schematic diagram showing the structure of the power adapter with cable organizer according to a further preferred embodiment of the present invention.

In the above-mentioned embodiments, the first blade 21 and the second blade 22 are both fixed to the main body 10 directly. For opening and closing the containing/fixing portion 20 more flexibly, the present invention provides another power adapter with cable organizer, as shown in FIG. 6. The power adapter includes a main body 10 and a containing/fixing portion 20. The containing/fixing portion 20 includes a first blade 21 and a second blade 22. The first blade 21 and the second blade 22 are respectively disposed on the main body 10 and face each other to form a receiving portion 29, wherein the first blade 21 and the second blade 22 are connected to the main body 10 by two connecting portions 30 respectively. In this case, the connecting portions 30 are hinges. Due to the existence of the connecting portions 30, the first blade 21 or the second blade 22 can be opened and closed freely, so that the receiving portion 29 is more flexible and can be cooperated with the environment 50 more elastically. In this case, the receiving portion for containing cables can be adjusted effectively according to actual needs. Moreover, when the power adapter is picked up, the first blade 21 and the second blade 22 can be folded for facilitating storage.

Figure 7:
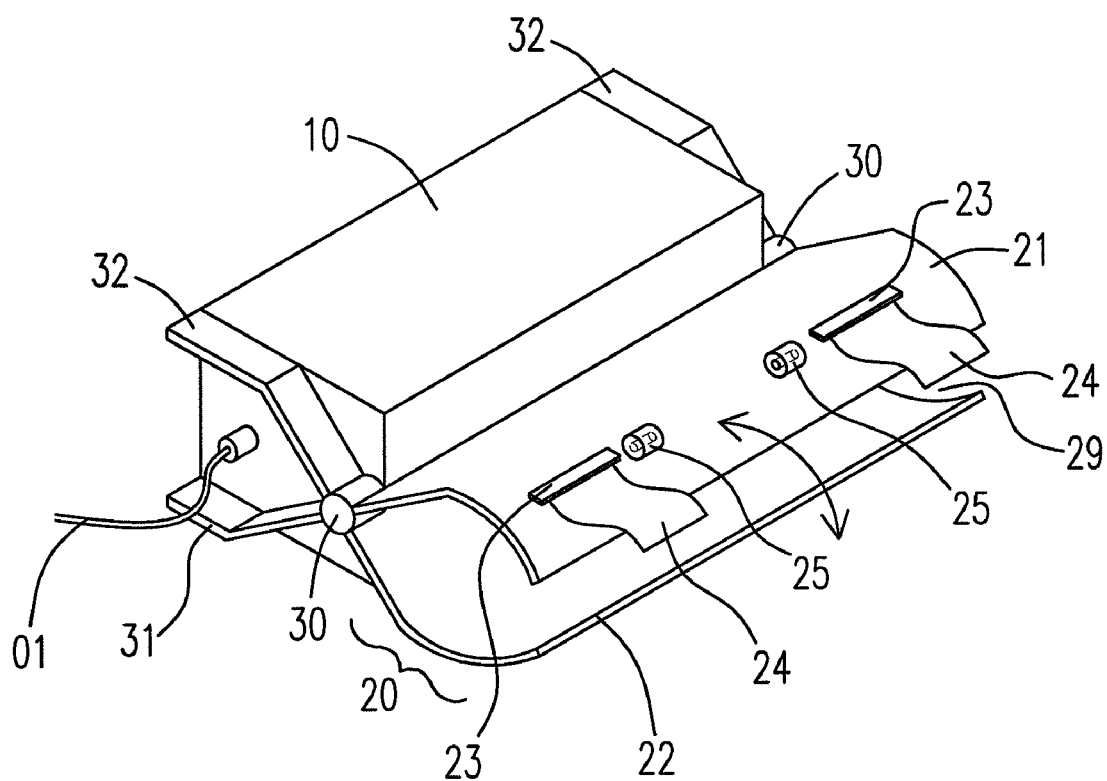
FIG. 7 is a schematic diagram showing the structure of the power adapter with cable organizer according to further another preferred embodiment of the present invention.

Please refer to FIG. 7, which is a schematic diagram showing the structure of the power adapter with cable organizer according to further another preferred embodiment of the present invention. The power adapter includes a main body 10, two connecting portions 30 and a containing/fixing portion 20. The connecting portions 30 are rotatably disposed on the main body 10. The containing/fixing portion 20 includes a first blade 21 and a second blade 22, wherein the first blade 21 and the second blade 22 are jointly connected to a side of the connecting portions 30 and face each other to form a receiving portion 29. Two first extending force-applying portion 31 and two second extending force-applying portion 32 are respectively extended from another side of the connecting portions 30. The first blade 21 and the second blade 22 are opened outward by applying force to the first extending force-applying portions 31 and the second extending force-applying portions 32.

The above-mentioned embodiment uses the connecting portions 30 as fulcrums and applies force to the first extending force-applying portions 31 and the second extending force-applying portions 32 to adjust the size of the receiving portion 29 formed by the first blade 21 and the second blade 22. Practically, the size of the receiving portion 29 can also be adjusted by only one connecting portion 30 which connects one first extending force-applying portion 31 and one second extending force-applying portion 32.

In conclusion, the present invention effectively solves the problems and drawbacks in the prior art, and thus it fits the demand of the industry and is industrially valuable.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A power adapter with cable organizer, comprising:
    a main body;
    a containing/fixing portion disposed on the main body and having a first blade and a second blade, wherein the first blade and the second blade face each other to form a receiving portion to cause the power adapter to be fixed at an environment; and
    at least one force-applying element disposed at an outer surface of at least one of the first blade and the second blade, wherein at least one of the first blade and the second blade is opened outward by applying a force to the force-applying element.

2. The power adapter with cable organizer as claimed in claim 1, further comprising at least one auxiliary fixing portion disposed at an outside of at least one of the first blade and the second blade, and a fixing element is attached to the at least one auxiliary fixing portion.

3. The power adapter with cable organizer as claimed in claim 2, wherein the fixing element is one selected from a group consisting of a string, a rope, a Velcro, a clip, a magnet, an adhesive or an arbitrary combination thereof.

4. A power adapter with cable organizer, comprising:
    a main body;
    a connecting portion rotatablely disposed on the main body;
    a containing/fixing portion having a first blade and a second blade, wherein the first blade and the second blade are jointly connected to a side of the connecting portion and face each other to form a receiving portion to cause the power adapter to be fixed at an environment; and
    a first extending force-applying portion and a second extending force-applying portion respectively extended from another side of the connecting portion,
    wherein the first blade and the second blade are opened outward by applying a force to the first extending force-applying portion and the second extending force-applying portion.

5. The power adapter with cable organizer as claimed in claim 4, further comprising at least one auxiliary fixing portion disposed at an outside of at least one of the first blade and the second blade, and a fixing element is attached to the at least one auxiliary fixing portion.

6. The power adapter with cable organizer as claimed in claim 5, wherein the fixing element is one selected from a group consisting of a string, a rope, a Velcro, a clip, a magnet, an adhesive or an arbitrary combination thereof.

* * * * *